United States Patent [19]
Morris

[11] Patent Number: 5,900,799
[45] Date of Patent: May 4, 1999

[54] HIGH RESPONSIVITY THERMOCHROMIC INFRARED DETECTOR

[75] Inventor: Henry B. Morris, Mesa, Ariz.

[73] Assignee: McDonnell Douglas Corporation, St. Louis, Mo.

[21] Appl. No.: 08/949,325

[22] Filed: Oct. 3, 1997

[51] Int. Cl.⁶ .................................................. H01L 31/08
[52] U.S. Cl. .................................................. 338/18; 338/15
[58] Field of Search .................. 338/15, 17–19; 250/352

[56] References Cited

U.S. PATENT DOCUMENTS

| | | | |
|---|---|---|---|
| 4,654,622 | 3/1987 | Foss et al. | 338/14 |
| 5,017,786 | 5/1991 | Jungkman et al. | 250/352 |
| 5,286,976 | 2/1994 | Cole | 250/349 |
| 5,450,053 | 9/1995 | Wood | 338/18 |

*Primary Examiner*—Michael L. Gellner
*Assistant Examiner*—Richard K. Lee
*Attorney, Agent, or Firm*—Westerlund & Powell, P.C.; Robert A. Westerlund; Ramon R. Hoch

[57] ABSTRACT

A high responsivity thermochromic infrared detector which has an operating temperature that is established on the steepest part of the phase transition curve and is maintained there while the infrared detector is operated.

11 Claims, 7 Drawing Sheets

HIGH RESPONSIVITY THERMOCHROMIC INFRARED DETECTOR

BACKGROUND OF THE INVENTION

The invention relates to infrared detection technology, and, more particularly, to a high responsivity thermochromic infrared detector and a mode of operation thereof.

Infrared (IR) sensors have been available since the 1940s to detect, measure, and image the thermal radiation emitted by objects. In general, infrared detectors operate by converting IR photons and energy to electrical signals. Detector requirements for missile seekers and forward looking infrared (FLIR) sensors led to high volume production of photoconductive (PC) HgCdTe arrays in the 1970s. However, size and performance limitations of first generation FLIRs required development of self-multiplexed focal plane arrays (FPAs) with on-chip signal processing. Second generation thermal imaging systems thus have used high-density FPAs with relatively few external connections. These second generation thermal imaging devices generally have been fabricated in monolithic and hybrid methodologies. In a monolithic FPA, the detector array and the multiplexing signal processor are integrated in a single substrate. In a hybrid FPA, the constituents, detector arrays and pre-amplifier/multiplexer, are fabricated on separate substrates and interconnected. Further, many detector and readout types are used in two basic FPA architectures of staring and scanning types. The simplest scanning device consists of a linear array in which an image is generated by scanning the scene across the strip. A staring array is the two-dimensional extension of a scanning array; it is self-scanned electronically, can provide enhanced sensitivity, and it is particularly suitable for lightweight cameras and infrared missile seekers.

In any event, FPAs use either photon or thermal detectors. Photon detection is accomplished using intrinsic or extrinsic semiconductors and either photovoltaic, photoconductive or metal insulator semiconductor technologies. Thermal detection relies on capacitive or resistive bolometers. In either case, the detector signal is coupled into a signal multiplexer and read out in video format.

Due to advanced detector materials and microelectronics, large scanning and staring FPAs are now readily available in the short wavelength infrared (SWIR; 1 to 3 $\mu$m), medium wavelength infrared (MWIR; about 3 to 5 $\mu$m), and long wavelength infrared (LWIR; about 8 to 14 $\mu$m) spectral bands. The primary spectral bands for infrared imaging are 3–5 and 8–12 $\mu$m, because atmospheric transmission is highest in these bands.

Also, with the more recent advent of inexpensive, uncooled infrared detectors, industrial and law enforcement applications of infrared cameras in particular have dramatically increased. FPA costs are currently relatively similar for all second generation, large format FPA technologies. Therefore, key factors which will determine which FPA technology will most succeed in the future likely will be improvements achieved in availability and cost.

One current vintage of IR detector type encompasses various bolometer detectors, of both resistive and capacitive varieties. Bolometers sense incident radiation via energy absorption and concomitant change in device temperature in both cooled and uncooled schemes. A microbolometer FPA for uncooled applications consists of thin-film semiconductor photoresistors micromachined on a silicon substrate. The uncooled IR FPA is fabricated as an array of microbridges with a thermoresistive element in each microbridge. The resistive microbolometers have high thermal coefficient of resistance (TCR) and low thermal conductance between the absorbing area and the readout circuit which multiplexes the IR signal. As each pixel absorbs IR radiation, the microbridge temperature changes accordingly and the elemental resistance changes. The most recent devices use semiconductor films of about 500 Å thickness having TCR of 2 percent per °C. The spacing between the microbridge and the substrate is selected to maximize the pixel absorption in the 8–14 $\mu$m wavelength range. Standard photolithographic techniques are use to pattern the thin film to form detectors for individual pixels.

As the thermoresistive element material, suitable materials include several transition metal oxides and sulfides which exhibit thermochromic behavior, i.e., a reversible phase change from a low temperature semiconductor phase to a high temperature metallic phase. The crystal phase change occurs over a narrow temperature range (i.e., <2° C.) starting at a characteristic transition temperature. The crystal phase change results in a several orders of magnitude change in electrical conductivity in the material. The crystal phase change can be very rapid, occurring within femtoseconds, and is totally reversible. However, there is usually some transition temperature hysteresis, which can be as much 10° C.

A heavily investigated thermochromic material is vanadium oxide ($VO_2$). Most frequently, its transition temperature is reported to be approximately 68° C. Prior investigators have observed as much as a factor of $10^5$ decrease in the bulk resistivity ($\omega$.cm) of single crystal $VO_2$ in a <1° C. temperature interval as it transitions from a semiconductor to a metal at approximately 68° C. as illustrated in FIG. 1. See, Kucharczyk, D. et al., *J. Appl. Cryst.*, 12, 370 (1979); Paul, W., *Mat. Res. Bull.*, 5, 691 (1970). Four orders of magnitude change in resistivity have been observed in polycrystalline thin films. See, De Natale, J. F., *Mat. Res. Soc. Symp. Proc.*, 374, 87 (1995); Case, F., *Applied Optics*, 30, 4119 (1991).

As described in U.S. Pat. No. 5,450,053 to Wood, a microbolometer infrared detector has been developed based on vanadium oxides, preferably $VO_2$. A resonant cavity is formed between the detector element and the multiplexer beneath it. To accomplish this, a <1000 Å thick vanadium oxide film is deposited on a thin dielectric film (e.g. a $Si_3N_4$ film) suspended in air above a multiplexer chip by a dielectric bridge. The microbolometer FPAs are fabricated as an array of microbridges with a thermochromic material element in each microbridge. This provides good thermal isolation from the multiplexer so as not to limit the thermal responsivity of the detectors. The $VO_2$ in such a microbolometer detector may not have a steep phase transition slope. In fact, U.S. Pat. No. 5,450,053 teaches a preferred operation of the $VO_2$ detector in the semiconductor phase.

U.S. Pat. No. 5,286,976 to Cole teaches a microstructure design for high IR sensitivity having a two level infrared bolometer microstructure, the lower level having a reflective metal film surface to reflect IR penetrating to that level. The upper and lower levels are separated by an air gap of about 1–2 microns which allows the reflected IR to interfere with the incident IR and increase sensitivity to a higher level. The vanadium oxide bolometer of U.S. Pat. No. 5,286,976 is stated to be preferably operated in the semiconductor phase.

This circumstance of favoring operation of the vanadium oxide in the semiconductor phase in the above-mentioned prior art patents may be attributable, at least in part, to poor stoichiometry, poor crystalline quality (tending toward amorphous morphology), internal stress, or a combination of two or more of these factors which affect the phase transition characteristics. All of these factors are influenced by the method of deposition and post-deposition annealing.

For instance, Curve 2 in FIG. 1 of Begishev, A. R., et al., Sov. Phys. Tech. Phys., 24, (10), 1263 (1979), shows that the phase transition characteristics of oxygen deficient $VO_2$, i.e., $VO_x$ where x<2, has a relatively small slope, and the transition temperature is shifted to approximately 25° C. Based on this, the relatively low 2%/°C. responsivity of a microbolometer detector device based on the teachings of U.S. Pat. No. 5,450,053 indicates that the phase transition curve has a shallow slope, such as depicted in FIG. 2, or is operated in the semiconductor regime, as indicated as the preferred mode in the U.S. Pat. Nos. 5,286,976 and 5,450,053 themselves, where the TCR is relatively small.

An infrared camera marketed under the name of Sentinel IR camera, has been developed by Amber Engineering, a Raytheon Company, and is based on a 320×320 pixel focal plane array reportedly equipped with vanadium oxide microbolometer detectors of the type as taught in U.S. Pat. No. 5,286,976. The Sentinel IR camera produces nearly blemish free IR images (320×240 pixels) in the 8–12 $\mu$m wave long-wavelength (LWIR) band. The approximately 38.7×38.7 $\mu$m vanadium oxide detectors are integrated on a silicon CMOS multiplexer chip on 50×50 $\mu$m centers. Since there are no indium bump-bonds in the FPA, high reliability is obtained, and the FPA is considered to be a monolithic device. The Sentinel IR camera's target detection and recognition range (kilometers) performance, however, may be limited by both resolution of its optics and low thermal responsivity (amps/watt) of the vanadium oxide detectors. A 2% change in responsivity per 1° C. change in detector temperature has been reported for this camera by the manufacturer, which is consistent with the operation of its microbolometer focal plane arrays at approximately 20° C., therefore, most likely in the semiconductor phase.

FIG. 3 depicts an IR detector 300 including a $VO_2$ thermochromic detector 30, such as taught by U.S. Pat. No. 5,286,976, connected to CMOS multiplexer 31, including an intervening air gap 37, in a manner considered to be used in Amber's Sentinel IR camera. A thin film dielectric member 32 formed of $Si_3N_4$ forms a microbridge structure that supports a vanadium oxide microbolometer detector element of approximately 38.7×38.7 $\mu$m in an array. The detector pitch in Amber's 320×240 FPA is 50×50 $\mu$m, and the fill factor is about 60%. Therefore, the detector dimensions are approximately 38.7×38.7 $\mu$m. To connect the vanadium oxide film to a measuring circuit, the device circuitry shown includes contacts to pre-amp IC 34a, 34b, an aluminum address line 35, and a polysilicon address line 36. The thickness of the $VO_2$ film 33 for Amber's Sentinel IR camera device is reportedly 500 Å (500×10$^{-8}$ cm). The detector is designed to have a nominal resistance of 10 K$\omega$. From the detector dimensions and resistance mentioned above, one can calculate a resistivity of 5×10$^{-2}$ $\omega$.cm for the vanadium oxide in the microbolometer in the Sentinel IR camera. That is comparable to the resistivity of the vanadium oxide in the phase transition region, as is evident in FIG. 1. Therefore, to achieve the nominal 10 K$\omega$ resistance necessary for low noise multiplexing, the $VO_2$ detectors must be 500 Å thick, which is not enough for complete absorption of incident 8–12 $\mu$m IR energy in one pass. Either substantially thicker vanadium oxide material or a resonant cavity as taught by U.S. Pat. No. 5,286,976 needs to be used.

Additionally, currently used vanadium oxide based microbolometer detectors include those that are temperature stabilized at about 20° C. by cooling or heating them, as appropriate, with a thermoelectric device on which the FPA is mounted. Since conventional vanadium oxide based microbolometer detectors are preferably operated in a semiconductor phase, as stated in U.S. Pat. Nos. 5,450,053 and 5,286,976, accurate stabilization ostensibly is not required.

SUMMARY OF THE INVENTION

The present invention encompasses a high responsivity thermochromic infrared detector having an operating temperature that is established on the steepest part of the phase transition curve and that is maintained there while the detector is operated.

Operation in this thermochromic mode provides much higher thermal responsivity than operation in the semiconductor mode. An infrared detector of $VO_2$ or similar thermochromic material operated in the thermochromic mode, as in the present invention, exhibits a thermal responsivity much greater than 2%/°C.

In one embodiment of this invention, an infrared radiation detector is provided having, in combination, a thermochromic material attached to a semiconductor body in a manner effective to provide thermal isolation therebetween, and with contacts provided to the thermochromic material adapted for connection to a measuring circuit, wherein the thermochromic material is mounted on a thermoelectric heater/cooler that accurately maintains the operating temperature of the thermochromic material at or substantially at the steepest part of the phase transition curve of the thermochromic material.

This invention applies to both IR detectors integrated in either monolithic or hybrid focal plane arrays. The IR detectors of this invention can be bump-bonded to a silicon or GaAs multiplexer, or otherwise attached to the multiplexer.

Further, the inventive vanadium oxide based thermochromic infrared detectors, as used in focal plane arrays or individual detectors, display high responsivity (volts/watt) and low noise equivalent temperature difference (NE$\Delta$T). The "NE$\Delta$T" of a detector represents the temperature change $\Delta$K in an object whose thermal radiation is being sensed, that results in an output signal equal to the rms noise level. The $VO_2$ based thermochromic detectors of this invention have NE$\Delta$Ts comparable in value to back-side illuminated HgCdTe photodiodes operated at about 77 K. Thus, the thermochromic detector of the present invention is competitive with HgCdTe and InSb detectors since the inventive thermochromic detectors cost considerably less to manufacture and do not require cryogenic operation.

BRIEF DESCRIPTION OF THE DRAWINGS

These and various other features and aspects of the present invention will be readily understood with reference to the following detailed description read in conjunction with the accompanying drawings, in which.

DETAILED DESCRIPTION OF THE INVENTION

This invention relates to infrared detectors or sensors formed from any thermochromic material, including $VO_2$ and related materials, such as $V_2O_3$, $V_2O_5$, $V_2O_2$, $V_4O_7$, $Ag_2S$, and $VO_x$ where $x \leq 2$, in which these detectors are operated in the thermochromic mode, i.e., at or near (i.e., ±0.5° C.) the location of the steepest slope in the thermochromic material's phase transition curve. The phase transition curve is expressed as bulk resistivity (or conductivity) as a function of material temperature. For purposes of this invention, the terminology "steepest slope" is the largest value of $|\Delta y/\Delta x|$ (i.e., slope in absolute value), which is determinable as the largest absolute value of the first derivative of a mathematical curve fit defining the graph. The phase transition curve of the particular thermochromic material being used can be determined empirically, as will be understood by one of ordinary skill in the art. The phase transition curve can be mathematically curve fit using conventional computer programs available for this purpose. Then, the location of the "steepest slope" in the curve can be identified for establishing the temperature at which the thermochromic material will be maintained during operation of the infrared detector.

In general, the temperature of the thermochromic material can be accurately maintained at the steepest slope point of the phase transition curve in the practice of this invention by appropriate heating or cooling by use of a Peltier effect device, also referred to herein as a thermoelectric (heater/cooler) device, so as to adjust and maintain the thermochromic material's bulk temperature at the location of the steepest slope of its phase transition curve during operation of the IR detector. As understood by one of ordinary skill in the art, a Peltier effect device is driven with one polarity to function as a heater and with a reverse polarity to function as a cooler.

For example, for $VO_2$, the Peltier effect device will need to be used to initially heat the $VO_2$ in the sensors up to the thermochromic operating point (i.e., point "TOP" in FIG. 4), which is the location of the steepest slope of the phase transition curve. The thermochromic operating point for for undoped $VO_2$ typically will be at approximately 68° C. On the other hand, if the thermochromic material is $V_2O_3$, for example, the Peltier effect device will need to be used to initially cool the $V_2O_3$ in the sensors to about −127° C., which is its typical semiconductor-to-metal transition temperature. Then, during operation of the infrared detector, heating or cooling, as needed, will be provided using the Peltier effect device to maintain the vanadium dioxide material at the location of the steepest slope of its phase transition curve. The invention will be even further understood by considering the following exemplary embodiments.

Figure 5A:
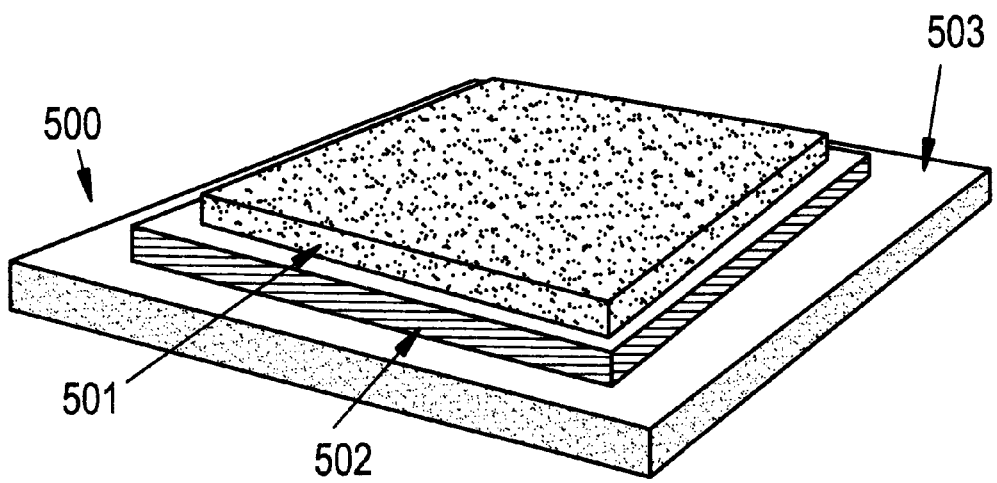
FIG. 5A depicts a configuration for an infrared radiation detector assembly of this invention with a monolithic thermochromic FPA.

FIG. 5A depicts one exemplary infrared radiation detector 500 of this invention including a monolithic thermochromic focal plane array (FPA) 501 disposed on a thermoelectric (heater/cooler) device 502, which, in turn, is disposed on a ceramic substrate 503. The monolithic FPA 501 is a detector array and a readout multiplexer integrated on the same semiconductor (e.g., silicon) substrate using processing steps compatible with the silicon VLSI technology.

The fabrication methodology of the invention is compatible with the fabrication of silicon integrated circuits (viz., FPA multiplexers) with $VO_2$ detectors integrated on the circuit to produce pseudo monolithic FPAs. The detector elements are suspended above the circuit for thermal isolation, such as according to conventional arrangements of microbolometer FPAs as taught in U.S. Pat. No. 5,286,976 or U.S. Pat. No. 5,450,053, whose teachings are incorporated herein by reference. Other configurations that provide requisite thermal isolation of the IR detector elements and good mechanical integrity may be utilized as well.

Figure 3:
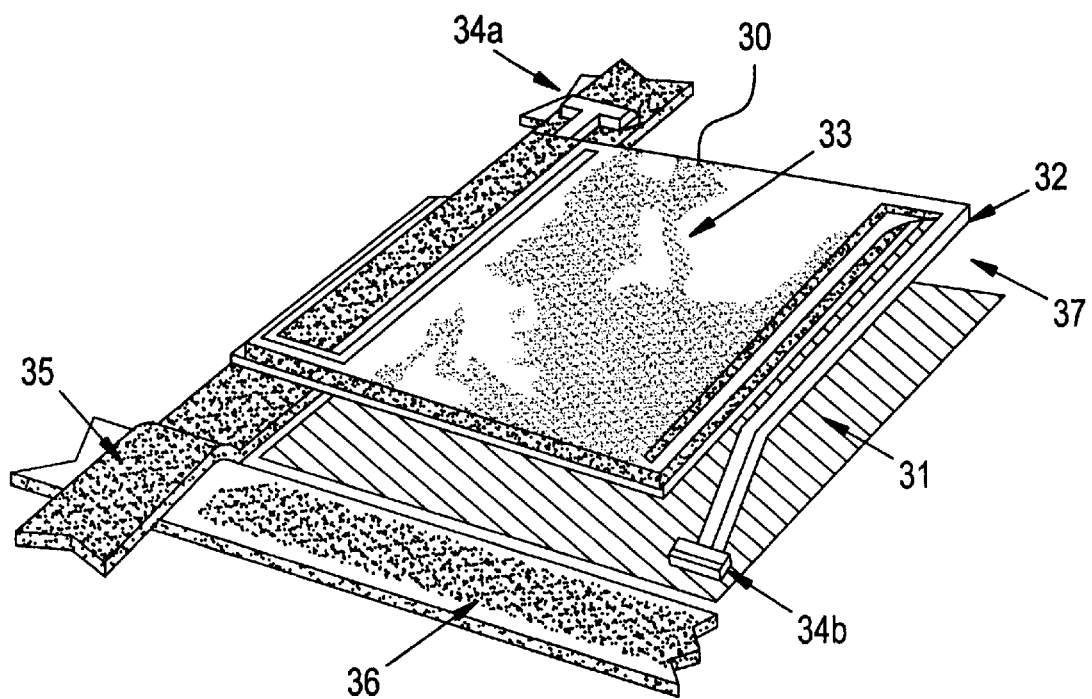
FIG. 3 depicts a known two-level configuration for an infrared radiation detector including a $VO_2$ thermochromic detector dispose a CMOS multiplexer.
Figure 6:
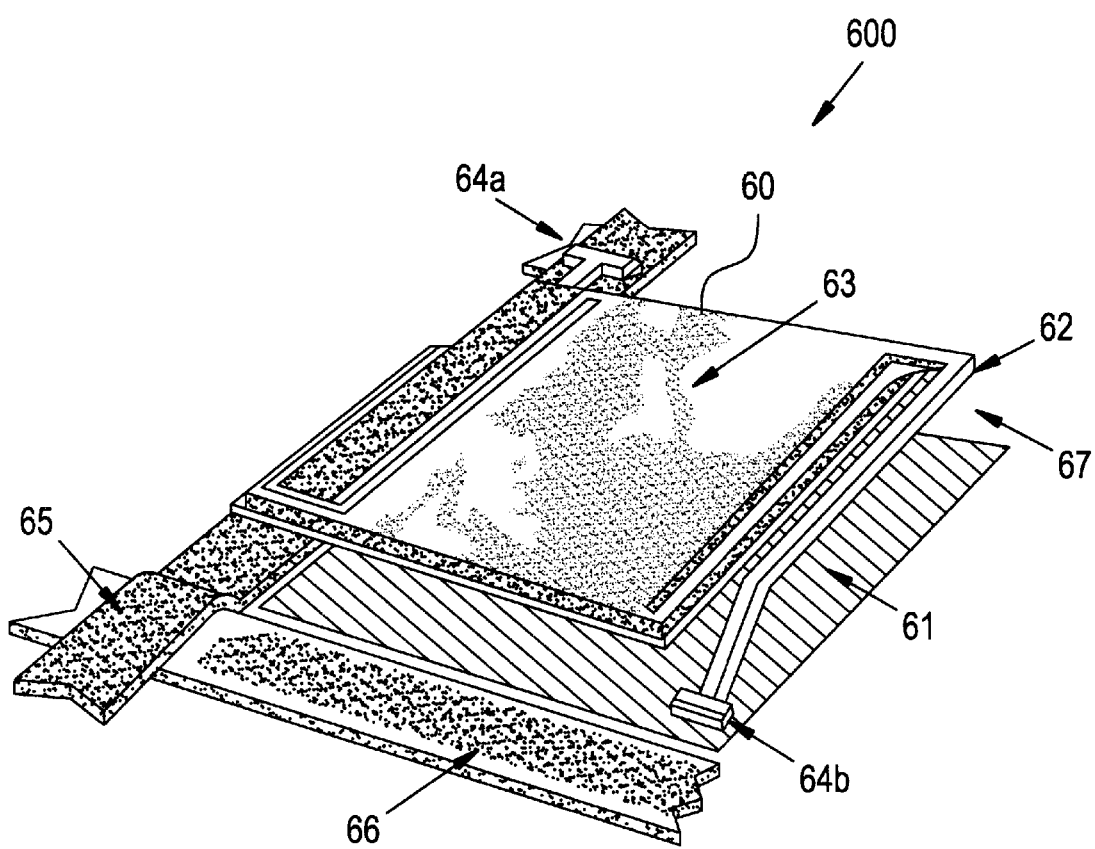
FIG. 6 depicts a two-level configuration for an infrared radiation detector including a $VO_2$ thermochromic detector disposed on a CMOS multiplexer used in this invention.

Namely, and similar architecturally to the two-level bolometer design shown in FIG. 3, FIG. 6 shows a two-level microstructure design that can be used in fabricating the monolithic thermochromic FPA 501 shown in FIG. 5A. A $VO_2$ thermochromic detector film material 60 is connected to a CMOS multiplexer 61 with an intervening air gap 67 of approximately 1–2 μm in ambient atmosphere. A thin film dielectric member 62 formed of $Si_3N_4$ forms a microbridge structure that supports the $VO_2$ IR detector element 60 in each microbridge. The detector pitch can be 50×50 μm for a 320×240 FPA, and the fill factor can be about 60% corresponding to detector dimensions of approximately 38.7×38.7 μm. To connect the vanadium dioxide film 60 to a measuring circuit, the device circuitry shown includes contacts to pre-amp IC 64a, 64b, an aluminum address line 65, and a polysilicon address line 66.

Figure 4:
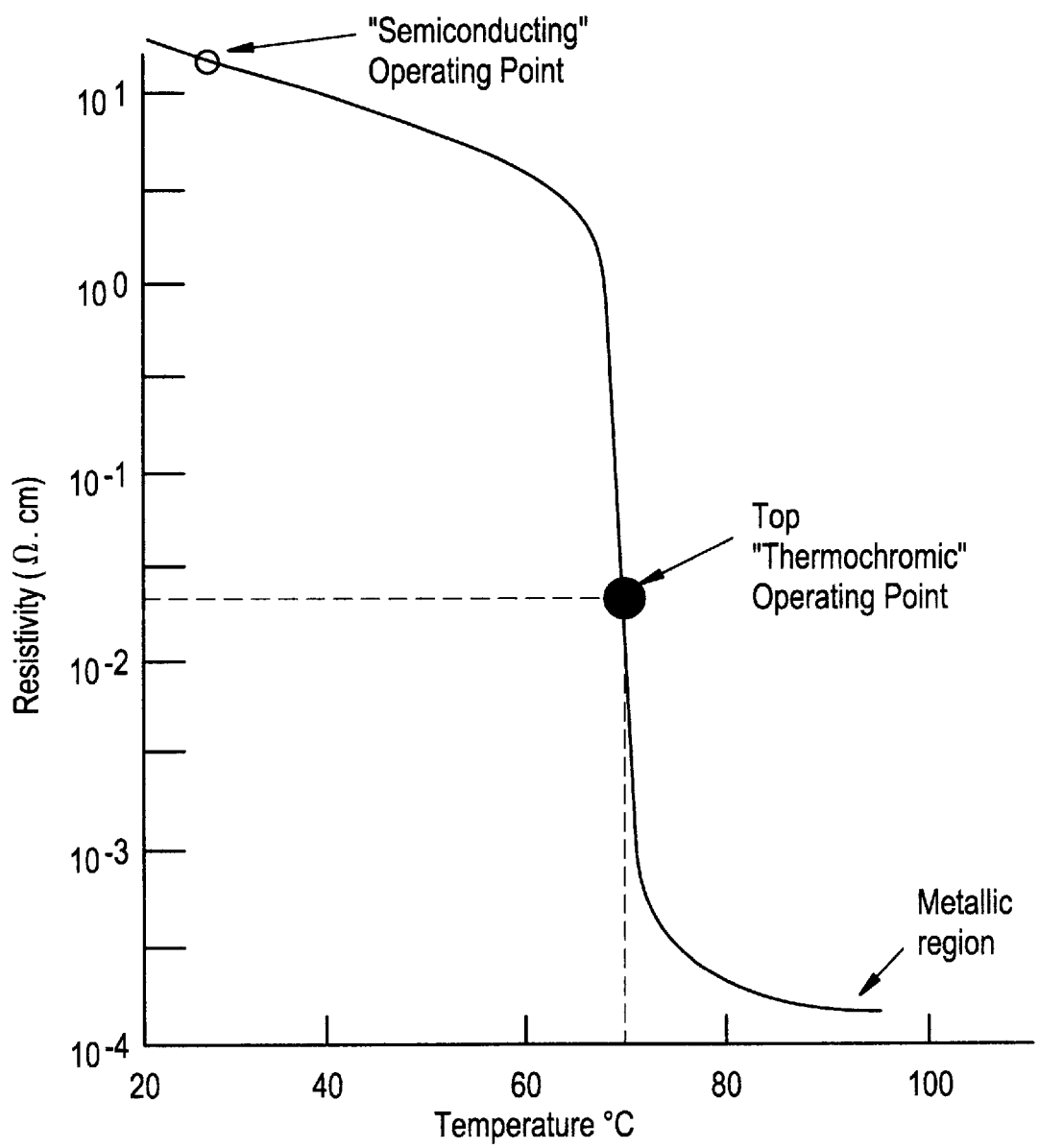
FIG. 4 shows the appropriate operating point on the $VO_2$ phase transition curve for operation in the thermochromic mode according to the present invention.

The thermoelectric (heating/cooling) device 502 shown in FIG. 5A is used to maintain the thermochromic vanadium dioxide film 60 at the steepest portion of its phase transition curve, i.e., the thermochromic operating point 'TOP' as shown in FIG. 4, that is located between the semiconductor and metal phases of the transition curve during operation of the IR detector.

Figure 1:
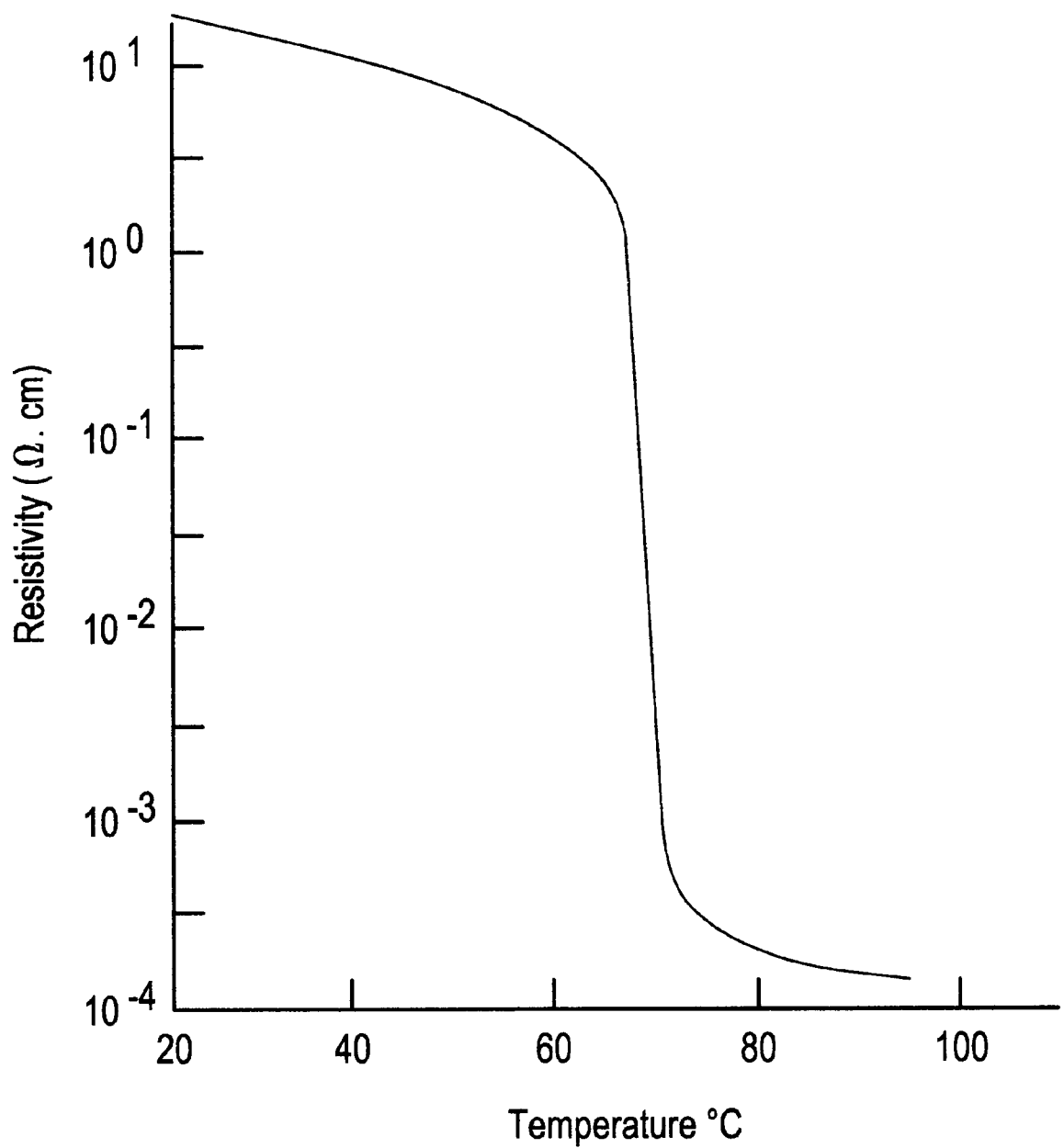
FIG. 1 is phase transition curve for single crystal $VO_2$ with bulk resistivity ($\omega$.cm) shown as a function of temperature.
Figure 2:
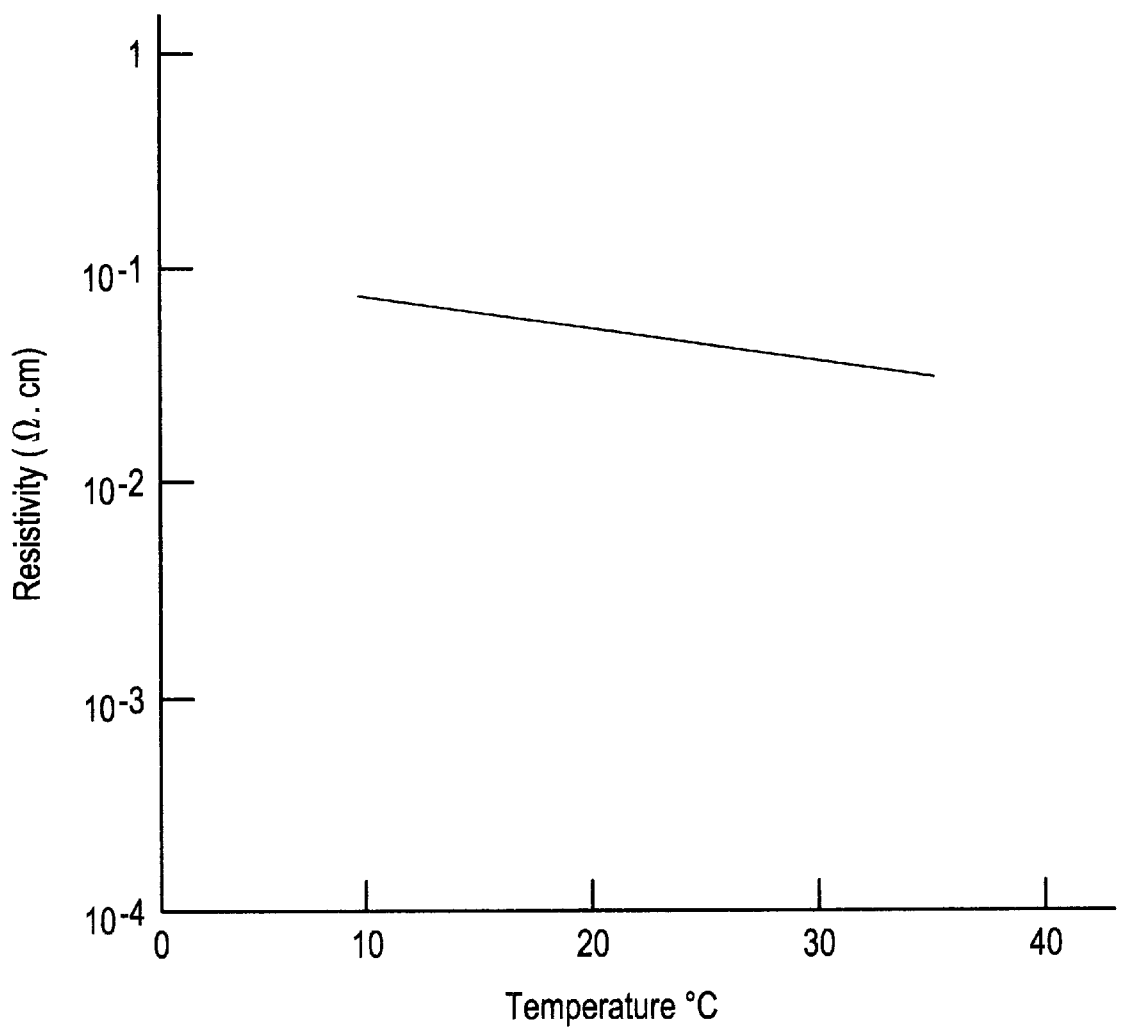
FIG. 2 depicts drastic degradation of the thermochromic transition curve and reduced slope resulting from modification of the $VO_2$.

The thermochromic infrared detector microsensor material 60 of this invention can be formed in the following manner. Vanadium dioxide can be readily deposited as a film on various substrates, such as oxidized silicon, by several conventional techniques. These deposition methods include reactive sputtering, reactive evaporation, ion-assisted evaporation, and thermal evaporation of vanadium followed by thermal oxidation in oxygen at about 600° C. A facile deposition technique is E-beam evaporation of 200–2000 Å vanadium metal followed by oxidation in semiconductor grade $O_2$ at about 600° C. This deposition technique produces stoichiometric, polycrystalline $VO_2$ with good thermochromic properties. The thickness of the vanadium dioxide formed is preferably about 250 to 2500 Å. It is also possible to use monocrystalline vanadium oxide in the practice of this invention. The vanadium dioxide that can be used in this invention has a resistivity in the general range of $10^{-4}$ to 10 ω.cm depending on its temperature as shown in FIG. 1, and more preferably about $5 \times 10^{-2}$ ohm.cm at 68° C.

Also, the transition temperature of the thermochromic material, such as $VO_2$, can be adjusted downward, if desired, during its fabrication such as by doping the thermochromic film during its deposition with certain metals such as tungsten, hafnium, molybdenum, and nobium, which alter, typically lower, the transition temperature in a predictable manner. Also, deposition of a mixed phase of $VO_2$ and $V_2O_3$ is also contemplated as another technique for adjusting the transition temperature as desired.

Since operation in the thermochromic mode results in higher reflectivity in the $VO_2$ than in the semiconductor mode, an IR absorptive anti-reflector coating, which can be a conventional type, is applied to the $VO_2$ or other thermochromic material that is used.

Figure 5B:
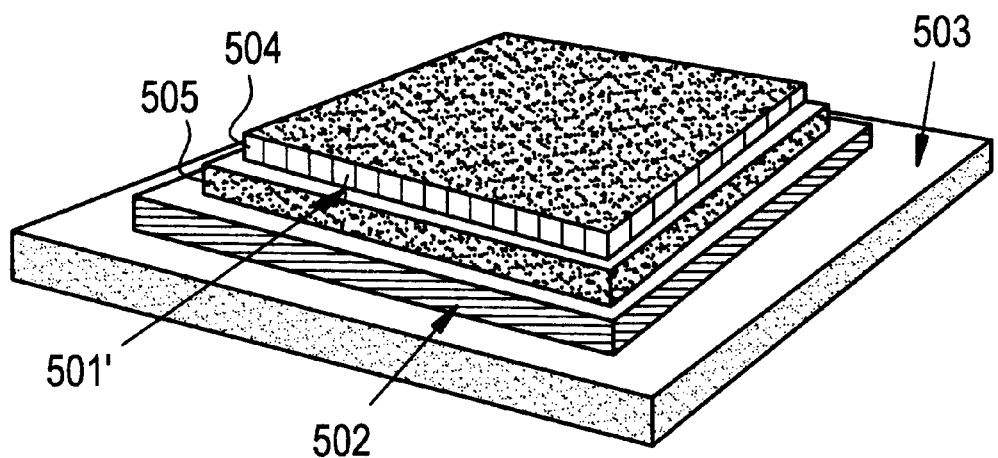
FIG. 5B depicts another configuration for an infrared radiation detector assembly of this invention with a hybrid thermochromic FPA.

In another embodiment of the invention shown in FIG. 5B, a hybrid thermochromic focal plane array (FPA) 501' is disposed on the thermoelectric (heater/cooler) device 502. The hybrid FPA includes a detector array 504 interconnected to a multiplexer readout chip 505. The thermochromic detector array 504 can be bump-bonded (not shown) to a silicon or a GaAs multiplexer readout 505. Alternatively, the thermochromic detector array 504 can be connected to a multiplexer readout chip 505 by wires (not shown) bonded to the thermochromic detector array and the multiplexer chip by a wire bonding method such as ball bonding or chisel bonding.

In either embodiment of FIG. 5A or 5B, and as discussed hereinabove, the thermochromic FPA 501 of this invention is mounted on a thermoelectric heater/cooler device 502 that accurately maintains the operating temperature at the steepest slope of the phase transition curve via a closed loop control system with active feedback (not shown). The feedback signal is the average thermal response signal (amps/°C.) or volts/°C.) for the FPA (average of 320×240 pixels) when viewing a calibration paddle at a known uniform temperature periodically inserted in the optical path for a frame time (viz., 33 msec.).

Figure 7:
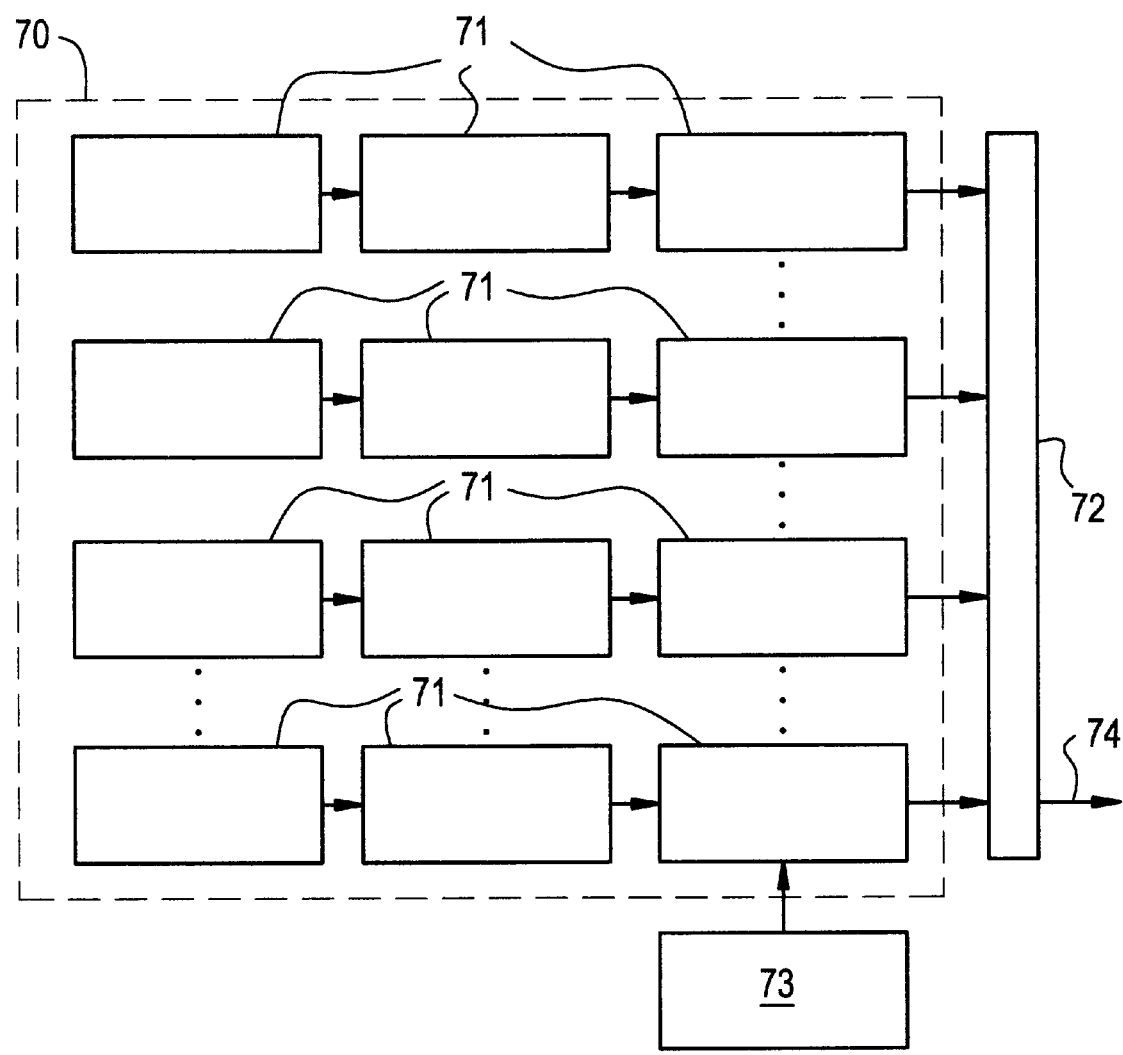
FIG. 7 shows the overall electronically scanned optically staring functional diagram.

FIG. 7 shows the overall functional diagram of this invention. The array of thermochromic IR detectors 71 have electrical leadouts to an electronic readout circuit as shown. The resistance of the microsensors changes when they receive direct infrared radiation. A low noise electronic circuit including a column address mux.72 and a row address mux.73 monitors the resistances of the microsensor elements and provides electrical signals 74 to signal processing circuitry such as target detection and recognition circuitry. The IR detectors 71 are fabricated as thermally isolated structures from their supporting structure by techniques described above. The detector array 71 can be conveniently fabricated on the silicon wafer substrate 70 by techniques described above to fabricate IR detectors 71 in a linear or two-dimensional array depending on whether a scanning or staring IR detector, respectively, is desired.

At least two control methods can be employed in operating the IR detectors of this invention. For one embodiment, periodically, the detector/FPA temperature is minutely modulated, and the derivative of the photosignal with respect to temperature is measured. This derivative and a signal corresponding to the derivative at the steepest part of the phase transition curve are fed into an operational-amplifier based comparator. The comparator's output, proportional to the signal difference, drives the thermoelectric device to heat or cool the detector/FPA temperature as required to reduce the difference to zero. The desired maximum phase transition derivative is determined through calibration and stored in a look-up table in the FPA's data processor, or dynamically stored in a capacitor for controlling a single detector or small array.

Alternatively, the detector/FPA temperature is dynamically adjusted via electronic feedback to maximize the thermal response signal. The average signal from the 320× 240 pixels is averaged periodically, e.g., every 1000 frames, and the temperature incrementally varied to seek the maximum response. Accurate control of the detector/FPA temperature with a thermoelectric device controlled by a closed loop system with electronic feedback is straightforward and readily implemented.

A $VO_2$ based infrared detector of this invention, as operated and maintained in the thermochromic mode according to the teachings herein, has at least a factor of 25× higher thermal responsivity (volts/watt) than conventional vanadium oxide based microbolometers. This conclusion is based on the following analysis. A factor of $10^4$ to $10^5$ decrease in resistivity is essentially a 100% change. If it occurs in a 2° C. span, the responsivity is 50%/°C., and a factor of 25 improvement is achieved. Moreover, if the change occurred in a 1.5° C. span, the responsivity would approach 67%/°C., a factor of about 33 improvement. Phase transistions from semiconductor to metal in the 1–2° C. span have been reported for good quality $VO_2$.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

For instance, the heating required when vanadium dioxide ($VO_2$) is used as the IR sensing material in the FPA, i.e., heating to about 68° C., is technically feasible, but such heating requirement may consume more electrical power than desired. Although not required, this consideration may be addressed by lowering the phase transition temperature of the sensing material to near ambient temperature (i.e., about 20–30° C.). Phase transition temperatures of less than 40° C. have been reported for $VO_2$ that have a sufficiently sharp phase transition.

Doping techniques, such as described hereinabove, could be used to adjust the transition region of the phase transition curve of vanadium dioxide to ambient temperatures to eliminate the need to heat the vandadium dioxide to about 68° C.

What is claimed is:

1. An infrared radiation detector comprising, in combination:

a thermochromic detector array comprised of a thermochromic material attached to a semiconductor body in a manner effective to provide thermal isolation therebetween, said thermochromic material having a phase transition curve representing bulk material resistivity ($\omega$.cm) of said thermochromic material as a function of material temperature, wherein said thermochromic material is present at an operating temperature at a location of steepest slope of said phase transition curve;

a thermoelectric heater/cooler device on which said thermochromic detector array is mounted, wherein said thermoelectric heater/cooler device maintains said operating temperature of said thermochromic material at said location of steepest slope of said phase transition curve of said thermochromic material.

2. The infrared detector of claim 1, wherein said thermochromic material is selected from the group consisting of polycrystalline vanadium dioxide and monocrystalline vanadium dioxide.

3. The infrared detector of claim 2, wherein said vanadium dioxide has a film thickness of about 250 to 2500 Å and a resistivity of about $5\times10^{-2}$ ohm.cm at 68° C.

4. The infrared detector of claim 1, wherein said semiconductor body is monocrystalline silicon.

5. The infrared detector of claim 1, wherein said thermochromic material comprises $V_4O_7$ and said operating temperature is about $-25°$ C.

6. The infrared detector of claim 1, wherein said thermochromic material comprises $V_2O_3$ and said operating temperature is about $-127°$ C.

7. The infrared detector of claim 1, wherein said thermochromic material comprises $V_2O_2$ and said operating temperature is about $-147°$ C.

8. The infrared detector of claim 1, further comprising a multiplexer selected from the group consisting of silicon and GaAs, and bump interconnections present between said thermochromic detector and said multiplexer.

9. The infrared detector of claim 1, wherein said thermochromic detector is connected to a multiplexer chip by wires or is ribbon bonded to said multiplexer chip by a wire bonding method selected from the group consisting of ball bonding, chisel bonding, and ribbon methods.

10. The infrared detector of claim 1, wherein said thermochromic material is selected from the group consisting of $VO_2$, $V_2O_3$, $V_4O_7$, $V_2O_2$, $Ag_2S$, and $VO_x$ where $x \leq 2$.

11. An infrared radiation detector comprising, in combination:

a thermochromic detector array comprised of a thermochromic material attached to a semiconductor body in a manner effective to provide thermal isolation therebetween, said thermochromic material having a phase transition curve representing bulk material resistivity ($\omega.cm$) of said thermochromic material as a function of material temperature, wherein said thermochromic material is present at an operating temperature of within $\pm 0.5°$ C. of a location of steepest slope of said phase transition curve;

a thermoelectric heater/cooler device on which said thermochromic detector array is mounted, wherein said thermoelectric heater/cooler device maintains said operating temperature of said thermochromic material at within $\pm 0.5°$ C. of said location of steepest slope of said phase transition curve of said thermochromic material.

* * * * *

UNITED STATES PATENT AND TRADEMARK OFFICE
CERTIFICATE OF CORRECTION

PATENT NO. : 5,900,799
DATED : May 4, 1999
INVENTOR(S) : Henry B. Morris

It is certified that error appears in the above-identified patent and that said Letters Patent is hereby corrected as shown below:

Claim 1,
lines 10-18, cancel beginning with "chromic material" to and including "said thermochromic material.", and substitute therefor the following:
-- chromic material has a temperature at a location of
steepest slope of said phase transition curve;
a thermoelectric heater/cooler device on which said
thermochromic detector array is mounted, and wherein said
thermoelectric heater/cooler device includes a measuring
circuit for measuring a temperature of said thermochromic
material and a closed loop control system with active
feedback coupled to said measuring circuit capable of
maintaining said temperature of said thermochromic material
at said location of steepest slope of said phase transition
curve. --

Claim 5,
Lines 2-3, "chromic material comprises $V_4O_7$ and said operating temperature is about -25°C." should read as -- chromic material comprises $V_4O_7$ --

Claim 6,
Lines 2-3, "chromic material comprises $V_2O_3$ and said operating temperature is about -127° C." should read as -- chromic material comprises $V_2O_3$. --

Claim 7,
Lines 2-3, "chromic material comprises $V_2O_2$ and said operating temperature is about -147°C." should read as -- chromic material comprises $V_2O_2$. --

UNITED STATES PATENT AND TRADEMARK OFFICE
CERTIFICATE OF CORRECTION

PATENT NO.   : 5,900,799
DATED        : May 4, 1999
INVENTOR(S)  : Henry B. Morris It is certified that error appears in the above-identified patent and that said Letters Patent is hereby corrected as shown below:

Claim 11,
lines 10-19, cancel beginning with "chromic material" to and including "material.", and substitute therefor the following:  -- chromic material has a temperature of within ±0.5°C of a location of steepest slope of said phase transition curve; a thermoelectric heater/cooler device on which said thermochromic detector array is mounted, and wherein said thermoelectric heater/cooler device includes a measuring circuit for measuring a temperature of said thermochromic material and a closed loop control system with active feedback coupled to said measuring circuit capable of maintaining said temperature of said thermochromic material at said location of steepest slope of said phase transition curve. --

Signed and Sealed this

Eighteenth Day of December, 2001

Attest:

Attesting Officer

JAMES E. ROGAN
*Director of the United States Patent and Trademark Office*